(12) United States Patent
Davies et al.

(10) Patent No.: US 10,185,469 B1
(45) Date of Patent: Jan. 22, 2019

(54) METHOD AND SYSTEM FOR ADVANCING THROUGH A SEQUENCE OF ITEMS USING A TOUCH-SENSITIVE COMPONENT

(71) Applicant: Google Inc., Mountain View, CA (US)

(72) Inventors: Benedict John Davies, London (GB); Yaroslav Volovich, Cambridge (GB)

(73) Assignee: Google LLC, Mountain View, CA (US)

( * ) Notice: Subject to any disclaimer, the term of this patent is extended or adjusted under 35 U.S.C. 154(b) by 455 days.

(21) Appl. No.: 14/987,680

(22) Filed: Jan. 4, 2016

Related U.S. Application Data (63) Continuation of application No. 13/314,754, filed on Dec. 8, 2011, now Pat. No. 9,230,393.

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/016* (2013.01); *G06F 3/0416* (2013.01);
(Continued)

(58) Field of Classification Search
CPC .. G07F 17/3244; G07F 17/32; G07F 17/3239; G07F 17/3211; G07F 17/323; G07F 17/3248; G07F 17/3276; G07F 17/34; G07F 17/3218; G07F 17/3225; G07F 17/3253; G07F 17/3262; G07F 17/3272; G07F 17/3297; G07F 17/3206;
(Continued)

(56) References Cited

U.S. PATENT DOCUMENTS 6,278,443 B1  8/2001  Amro et al.
6,690,387 B2  2/2004  Zimmerman et al.
(Continued)

OTHER PUBLICATIONS

Apache.org, Navigating Xml with Cursors (Mar. 6, 2005) http://xmlbeans.apache.org/docs/2.0.0/guide/conNavigatingXMLwithCursors.html.

*Primary Examiner* — Di Xiao
(74) *Attorney, Agent, or Firm* — Lowenstein Sandler LLP (57) ABSTRACT

A method includes outputting, at a display of an electronic device, a first content item in a sequence of content items, wherein the sequence comprises the first content item and a second content item that sequentially follows the first content item in the sequence, detecting a touch input received at a touch-sensitive component of the electronic device, and identifying a starting location on the touch-sensitive component, wherein the starting location includes a coordinate that corresponds to a location of the touch input. The method further includes responsive to detecting that an input stroke continuously applied at the touch-sensitive component has continuously moved from the starting point to a first threshold in a first direction, outputting, at the display, the second content item in the sequence, the first threshold location corresponding to a coordinate on the touch-sensitive component that is located a first threshold distance away, in a first direction, from the starting location, and responsive to detecting that the input stroke continuously applied at the touch sensitive component has moved across the first threshold location, reversing an order of display for the sequence of content items.

20 Claims, 4 Drawing Sheets

(51) Int. Cl.
*G06F 3/041* (2006.01)
*G06F 3/0488* (2013.01)
*G06F 3/01* (2006.01)
*G06F 3/0485* (2013.01)
*G06F 3/0484* (2013.01)

(52) U.S. Cl.
CPC ........ *G06F 3/0485* (2013.01); *G06F 3/04845* (2013.01); *G06F 3/04883* (2013.01)

(58) Field of Classification Search
CPC ............. G07F 17/3241; G07F 17/3255; G07F 17/3258; G07F 17/3267; G07F 17/3279; G07F 17/3286; G07F 17/329; G07F 17/3293; G07F 17/3295
See application file for complete search history.

(56) References Cited

U.S. PATENT DOCUMENTS

| | | |
|---|---|---|
| 7,184,064 B2 | 2/2007 | Zimmerman et al. |
| 7,345,675 B1 | 3/2008 | Minakuchi et al. |
| 7,469,381 B2 | 12/2008 | Ording |
| 7,542,845 B2 | 6/2009 | Sands et al. |
| 7,761,806 B2 | 7/2010 | Kim |
| 7,822,443 B2 | 10/2010 | Kim et al. |
| 2008/0174547 A1 | 7/2008 | Kanevsky et al. |
| 2009/0289913 A1 | 11/2009 | Chang et al. |
| 2010/0049344 A1 | 2/2010 | Capio |
| 2010/0141589 A1 | 6/2010 | Hoover |
| 2010/0146387 A1 | 6/2010 | Hoover |
| 2010/0235794 A1 | 9/2010 | Ording |
| 2010/0281374 A1 | 11/2010 | Schulz et al. |
| 2010/0321411 A1 | 12/2010 | Paek et al. |
| 2011/0016390 A1* | 1/2011 | Oh ................ G06F 3/0482 715/702 |
| 2011/0018833 A1 | 1/2011 | Kim et al. |
| 2011/0025720 A1 | 2/2011 | Jo et al. |
| 2011/0072345 A1 | 3/2011 | Lim |
| 2011/0080430 A1 | 4/2011 | Nishibe et al. |
| 2011/0119578 A1 | 5/2011 | Schwartz |
| 2011/0122159 A1 | 5/2011 | Bergsten et al. |
| 2011/0202936 A1 | 8/2011 | Todoroki |
| 2012/0210214 A1 | 8/2012 | Yoo et al. |

* cited by examiner

METHOD AND SYSTEM FOR ADVANCING THROUGH A SEQUENCE OF ITEMS USING A TOUCH-SENSITIVE COMPONENT

CROSS-REFERENCE TO RELATED APPLICATIONS

This patent application is a continuation of U.S. Non-Provisional application Ser. No. 13/314,754, filed Dec. 8, 2011, entitled "METHOD AND SYSTEM FOR ADVANCING THROUGH A SEQUENCE OF ITEMS USING A TOUCH-SENSITIVE COMPONENT" which is incorporated herein by reference for all purposes

BACKGROUND

Electronic devices with touch-sensitive interfaces are commonly used to store and access large volumes of similar items. For example, mobile phones, personal digital assistants, tablet computers, e-books and the like have touch screens and are used for storing contact lists, photographs, videos, and other content. Moving between a large number of similar items on a touch-sensitive interface can be difficult. The user must perform the same command or gesture over and over again. When users are required to repeatedly place a finger on the screen, perform a gesture, lift the finger off of the screen and return to a starting point to repeat the gesture again, the process can detract from the user's enjoyment of the content and also cause the user to suffer discomfort and strain.

This document describes improved methods and systems of navigating through a sequence of content items on a device having a touch-sensitive input component.

SUMMARY

In an embodiment, a method of displaying a sequence of content items on an electronic device, includes outputting (i.e., causing the display of) a content item at a display of the electronic device. When the device detects that a touch input has been received at a touch-sensitive component of the electronic device, it will identify a starting position on the touch-sensitive component. The starting position includes a coordinate that corresponds to a location of the touch input. The device will determine a first threshold location, which corresponds to a coordinate on the touch-sensitive component that is located a first threshold distance away, in a first direction, from the starting location. It will also determine a second threshold location, wherein the second threshold location corresponds to a coordinate on the touch-sensitive component that is located a second threshold distance, in a second direction, away from the starting location, wherein the second direction is opposite the first direction. When the device detects that an input stroke applied to the touch-sensitive component has continuously moved from the starting point to the first threshold without interruption, the display will output a next content item in the sequence. When the device then detects that the input stroke applied to the touch-sensitive component has continuously moved from the first threshold to the second threshold without interruption, the display will output a third content item in the sequence. This sequence may continue until the input stroke is interrupted.

In some embodiments, the sequence may automatically initiate. In others, the device may first determine whether the first content item is part of a sequence of content items. If so, the sequence may only be triggered, and the starting position may only be identified, if the device determines that the first content item is part of a sequence of content items.

The first threshold distance and the second threshold distance may or may not be equal, or may be within a predetermined distance from each other. In some embodiments, determining either of the threshold locations may include determining the corresponding threshold distance based on one or more stored attributes of a user.

In some embodiments, the method also may include determining a third threshold location. The third threshold location corresponds to a coordinate on the touch-sensitive component that is located a third threshold distance away from the starting location in either the first direction or the second direction. The third threshold distance is greater than both the first threshold distance and the second threshold distance. In this embodiment, when the device detects that the input stroke applied to the touch-sensitive component has continuously moved to cross the third threshold without interruption, it may cause the display to output a dynamic series of content items so long as the input stroke remains across the third threshold.

In some embodiments, the method may include detecting a speed of the input stroke. If so, the resolution of each content item may be adjusted based on the speed before the content item is displayed. For example, content may be displayed at a higher resolution when the stroke moves slowly, but at a lower resolution when the stroke is moving quickly. If the input stroke has been interrupted, the device may increase the resolution of the content item on the display.

In some embodiments, the method may include detecting that the touch signal moves across one of the thresholds three times without interruption and without crossing the other threshold. If so, it may reverse an order of display for the sequence of content items.

The device may include a display, a processor, a memory, and a touch-sensitive component. In some embodiments, the touch-sensitive component is an element of the display itself, such as a touch screen. The device also may be able to provide haptic feedback, such as a vibration, a sound, or other sensory feedback. If so, in response to detecting that the input stroke has continuously moved from the starting point to the first threshold without interruption, the device may provide haptic feedback. In response to detecting that the input stroke has continuously moved from the first threshold to the second threshold without interruption, the device may provide haptic feedback.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this application, the following terms shall have the respective meanings set forth below:

A "computing device" refers to an electronic device that performs one or more operations according to one or more programming instructions.

A "content item" refers to a discrete image that contains graphic and/or informational content that may be retrieved from a data file and displayed on the display of a computing device. Examples of content items include photographs or other still images, individual frames of a video sequence, information from a single record in a personal contacts database, and the like.

A "touch sensitive component" or "touch sensitive input component" refers to an input component of an electronic device that can detect the presence and location of a touch within an interface area. The touch may be that of a human finger, hand or other body part, or it may be that of a user-operated tool such as a stylus.

A "touch input" refers to an input signal received via a touch sensitive input component. A touch input may be generated when the input component detects a manual touch, such as that of a user's finger touching the input component. Alternatively, in some embodiments a touch input may be generated via the application of pressure to the input component by an intermediate device such as a stylus.

The embodiments described in this document relate to electronic devices that include a display and a touch-sensitive input component. Examples of suitable electronic devices include portable devices such as mobile phones, personal digital assistants, tablet computers, e-books, portable computers, portable media players, cameras and the like. The device may have a touch-sensitive component that is integrated with the display, such as a capacitive, resistive or other type of touch screen. Alternatively, the touch-sensitive component may be an item of hardware that is separate from the display, touch as a touch pad or trackpad.

Figure 1:
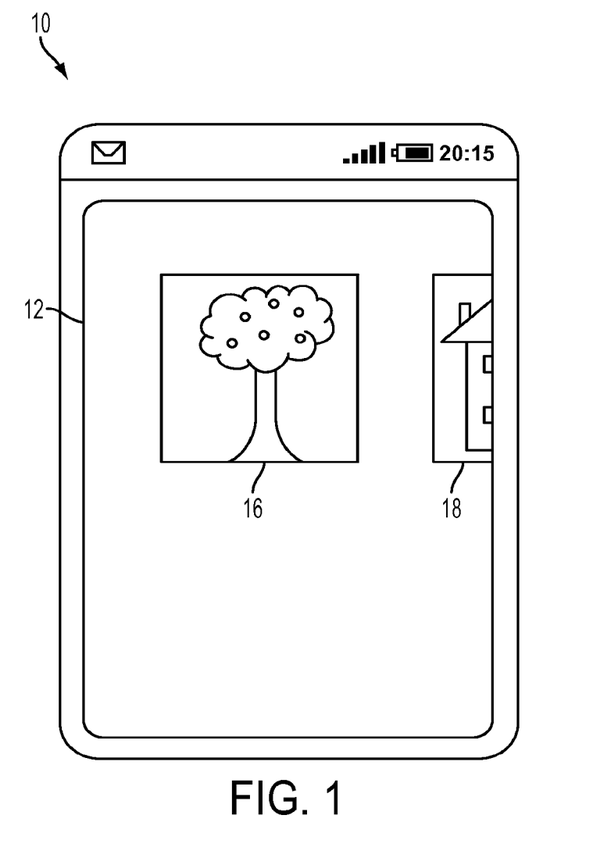
FIG. 1 illustrates an example of an electronic device with a touch-sensitive input component.

An example of an electronic device 10 with a touch sensitive component 12 is shown in FIG. 1. The input component 12 will include one or more sensors that detect a touch input and in response generate one or more signals that may be acted upon by a processor. The electronic device will include a processor, a tangible, computer-readable memory, and program instructions that implement a method of retrieving content items, displaying each of the content items 16, 18 in a sequence, and scrolling through the sequence of content items on the display. In some embodiments, the content items may be stored in the device's memory. In other embodiments, the content items may be stored in a remote storage location such as a networked server or a cloud storage device. If the items are stored remotely, the device may retrieve them from the remote storage location via one or more communication ports.

Figure 2:
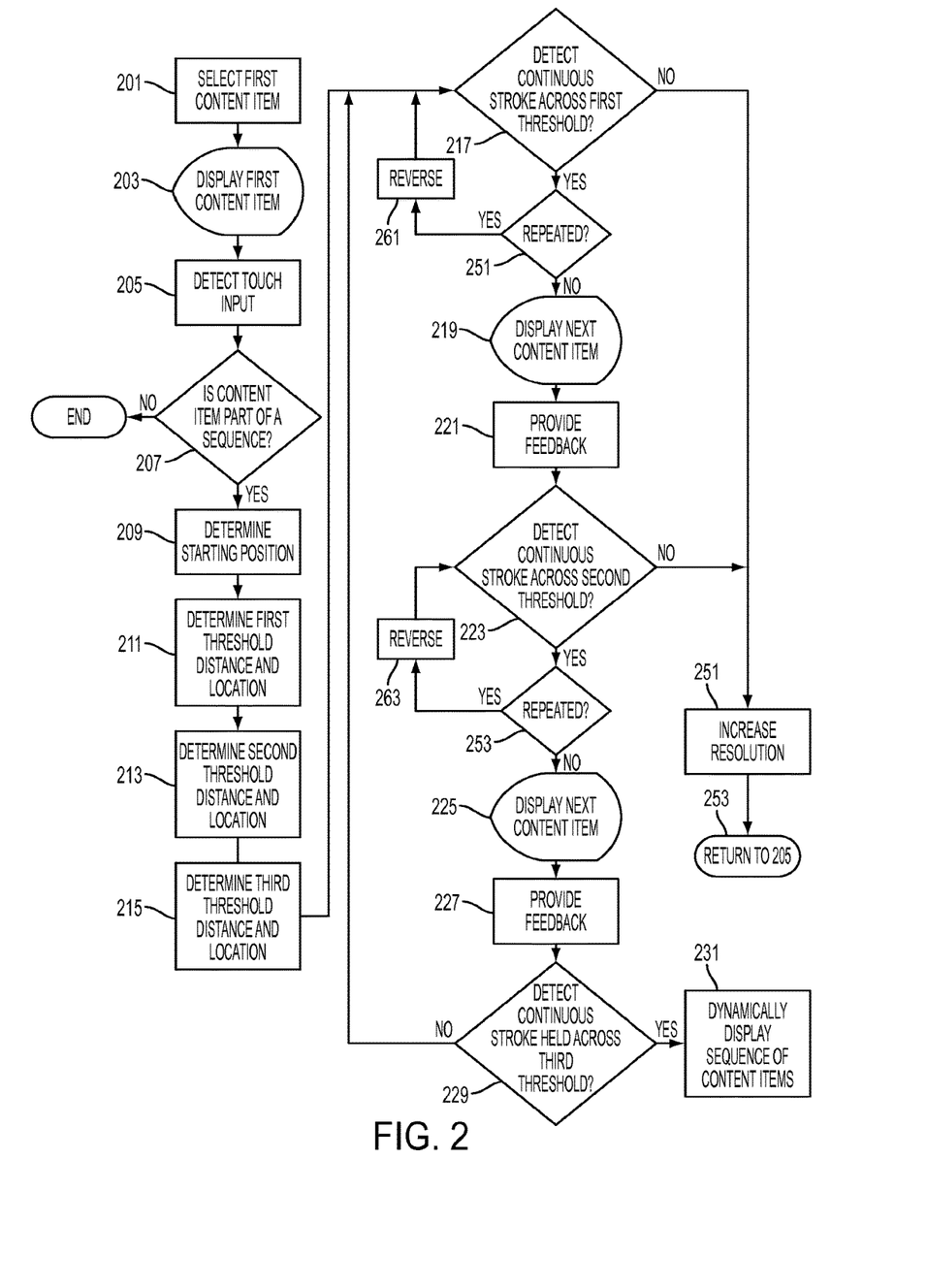
FIG. 2 is a flowchart illustrating steps of a process of operating an electronic device to advance through content items.

The embodiments described in this document may enable a user to move quickly and efficiently through a sequence of content items with a single, continuous interaction with the touch-sensitive interface. FIG. 2 is a flow diagram illustrating elements of operating the device. Referring to FIG. 2, the method may include selecting a first content item 201. Selecting may occur by receiving a user selection, such as may occur when a user uses a photo application to select a photo from a set of photos, a frame of a video from a video sequence, or a contact from a contacts database. Alternatively, selection may occur automatically, such as by selection of a default or random content item when the user first initiates the relevant application with which the content item is associated. The first content item will be displayed as an output at the display 203. In some embodiments, all or a portion of a next content item in the sequence and/or a prior content also may be displayed on the display (as shown in FIG. 1).

When the processor detects receipt of a touch input 205 via the touch-sensitive component, the processor may determine whether to initiate the sequential content display method. To do this, the processor may receive the touch input from one or more sensors and determine whether the first one of the content items is part of a sequence 207 of content items that are to be sequentially displayed. For example, the method may require that the processor first confirm that the content item is being displayed via a sequential content application such as a photo application, a video reel application, a contacts application or a similar software product. If the content item is not part of a sequence, then the method may terminate.

On the other hand, if the content item is part of a sequence, such as a single frame of a video, the processor will determine a starting position on the touch-sensitive component 209. The starting position includes one or more coordinates (such as an x-, y-coordinate pair) that corresponds to the location on the touch-sensitive component at which the touch input was received. The processor will determine a first threshold distance and establish a first threshold location 211. The first threshold distance will be a distance away from the starting position, and it may be located along an x-axis, a y-axis, or in some angular direction from the starting position.

Figure 3A:
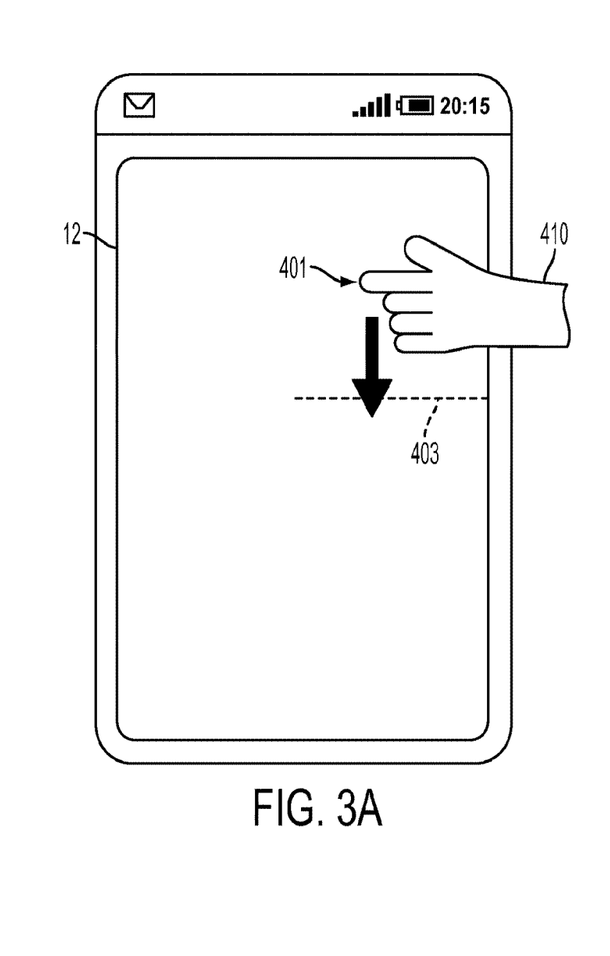
FIG. 3A and FIG. 3B illustrate how a user may use a touch-sensitive component of an electronic device to move through a series of content items.

The first threshold location may be a line that is perpendicular to the axis of the threshold distance and on which the first threshold distance is a point. For example, if the starting position on a 480×854 pixel touch screen display has (x, y) coordinates of (375, 240), then the threshold distance may be selected as +100 pixels in they-direction, and the first threshold location may include all pixels having a y-coordinate of 340. Alternatively, rather than including all pixels along an axis, the threshold location may be limited to pixels that are located a certain range away from the x-coordinate of the starting position. For example, if the range is plus or minus 50 pixels, then the first threshold location may be all pixels along the line that is from pixel (325, 340) to pixel (425, 340). This example is shown in Part A of FIG. 3, which shows a starting point 401 where the user 410 touches the touch screen 12. FIG. 3A also shows a first threshold location 403. Although this example uses a first threshold location that is oriented in they-direction from the starting position, other directions, such as the x-direction or an angular direction, may be used.

Figure 3B:
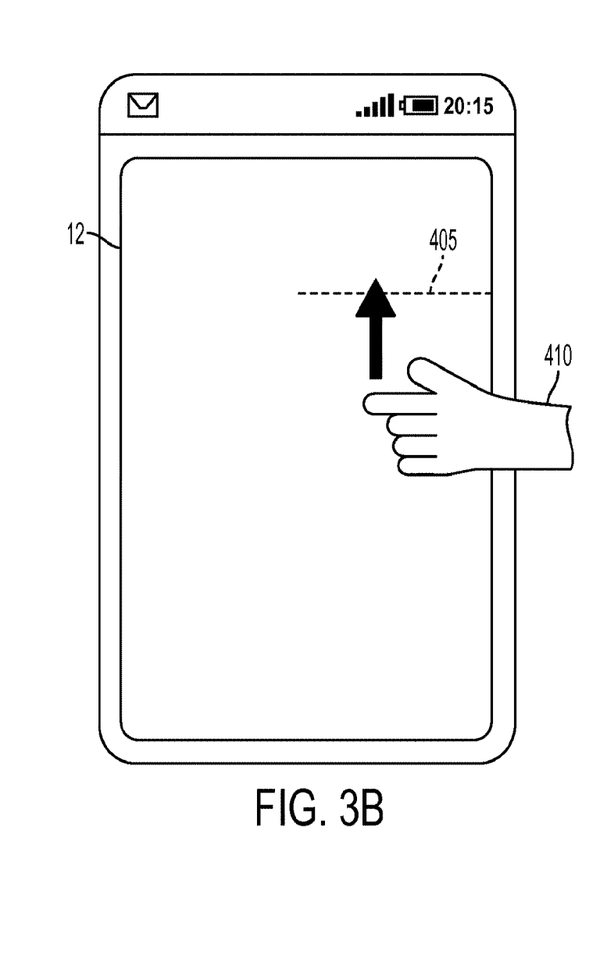

The processor will then determine a second threshold distance and establish a second threshold location 213. The second threshold distance will be a distance away from the starting position, and it will correspond to a coordinate on the touch sensitive component that is located a second threshold distance away from the starting location in a second direction that is opposite from the first direction. As used in this document, two directions are "opposite" each other if they are approximately 180 degrees away from each other. For example, as shown in Parts A and B of FIG. 3, the first threshold location 403 has a y-coordinate that is greater than that of the starting position 401 and is thus located below the starting position. The second threshold 405 that is less than that of the starting position 401 and thus is located above the starting position. In yet other embodiments, the first threshold location may be located above the starting position, while the second threshold location may be located below the starting position. The terms "above" and "below" are exemplary, and the terms "to the right of" and "to the left of", or other relative positional terms, may be substituted. In other embodiments, the second threshold distance may be zero, in which case the second threshold location will include the starting position.

The first and second threshold distances may be determined by any suitable methods. For example, the threshold distances may be predetermined and maintained by the programming instructions. Alternatively, the threshold distances may be determined as a mathematical function of the touch-sensitive input component size, screen orientation (portrait or landscape) and/or the coordinates of the starting position. For example, each threshold distance may be located a distance that is ten percent of the length of the input component away from the starting point, unless the starting position is located near an edge of the input component, in which case at least one of the threshold distances may be reduced by a factor to account for the edge location. In some embodiments, the first and second threshold distances may differ by less than a predetermined threshold. For example, the first and second threshold distances may or may not be equal to each other in various embodiments.

In some embodiments, the threshold distances also may be determined based on one or more attributes of the user. For example, the system may store data relating to previous strokes applied to the touch-sensitive component by the user and use the data to determine that the user typically applies long strokes (for example, strokes that cover at least 50% of a width or length of the component) or short strokes (for example, strokes that cover less than 20% of a dimension of the component). In either case, the method may select a threshold that equals or exceeds the user's average stroke length, or which otherwise considers the user's typical usage patterns.

Returning to FIG. 2, if the processor detects that the touch input moves across the first threshold without interruption 217, then the processor will select a second content item in the sequence and cause the second content item to be outputted at the display 219. If the sensor then detects that the touch input returns across the first threshold and then moves across the second threshold without interruption 223, then the processor will select a third content item in the sequence and cause the third content item to be outputted at the display 225. This process may repeat and continue to display additional content items until the touch input is interrupted, or until another action occurs as described below. The sequence of content items may be predetermined by a hierarchy, such as by date, alphabetical order, or another structure, or the processor may randomly generate the sequence.

As used in this document, the description of a stroke as "continuous" or "without interruption" means that the stroke continues to advance without interruption of the touch signal. For example, interruption may occur if the user lifts his or her finger or stylus from the input component. If the touch signal is interrupted, then the display sequence may stop 253, hold the then-current content item on the screen, and wait for the user to touch the screen again, thus re-starting the process. Optionally, the processor may cause the content to be displayed at an increased resolution 251 when the stop occurs, thus allowing for more rapid movement of content during scrolling by dynamically displaying the content at a lower resolution during scrolling activity, but outputting the content at a higher resolution when the scrolling stops.

When a sequence is displayed, the content may be displayed in a default order or direction, such as when frames of a video start at the beginning of a video sequence and continue in order toward the end of the sequence. In some embodiments, the user may have an option to reverse the direction of a sequence and go back to previously-viewed content. This may happen when a stroke crosses the first or second threshold to move into the area between the two thresholds, but reverses direction and crosses the first or second threshold again. For example, as illustrated in FIG. 2, if a continuous stroke repeatedly crosses the first (e.g., upper) threshold three times without crossing any other threshold 251, then the sequence may reverse 261 and continue to present content in the opposite direction. This may happen if, for example, the first threshold is an upper threshold and the stroke moves above the first threshold, then below the first threshold, then back up above the first threshold without crossing any other thresholds in between the three crossings. Similarly, if a continuous stroke repeatedly crosses the second (e.g., lower) threshold three times without crossing any other threshold 253, then the sequence may reverse 263 its direction and continue to present content in the opposite direction.

In some embodiments, when detecting movement of the stroke across the touch-sensitive component, the processor (via one or more input component sensors) also may detect a speed of movement of the stroke. If so, the system may determine one or more speed thresholds, and it may increase or decrease resolution of the displayed content as the stroke speed increases or decreases. For example, the system may start by displaying content at a default resolution, and it may reduce the resolution by, for example, 30% if the user's stroke speed indicates that three or more thresholds are crossed per second. On the other hand, if the user's stroke speed only crosses one threshold per second, then the system may increase the resolution of the displayed content by 30%. This allows the display to more appropriately meet the speed of the stroke and help ensure that the system is not slowed by high-resolution graphics if the user is trying to rapidly advance through the content. The speeds and percentages listed in this paragraph are intended only as examples, and any speeds or resolution metrics may be used.

Figure 4A:
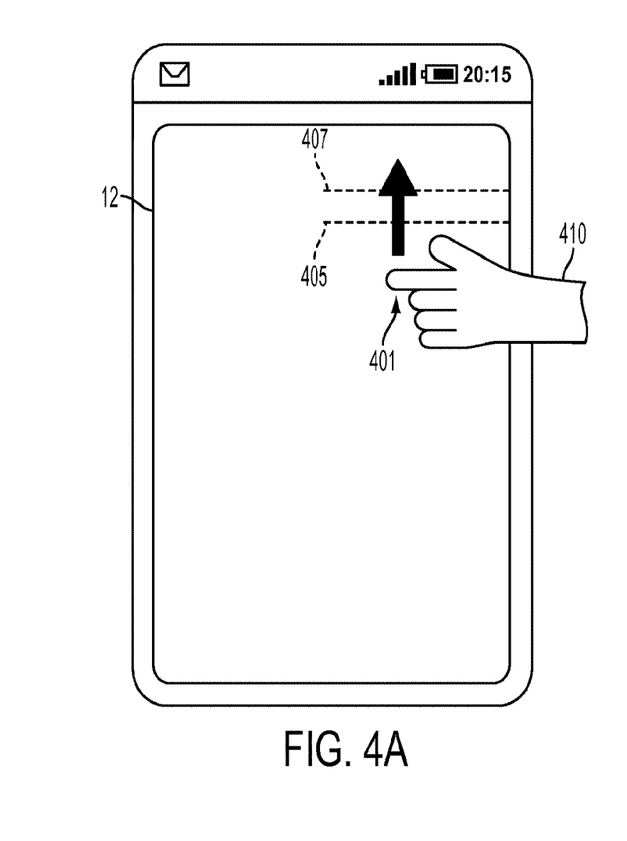
FIG. 4A and FIG. 4B illustrate additional ways that a user may use a touch-sensitive component of an electronic device to move through a series of content items.
Figure 4B:
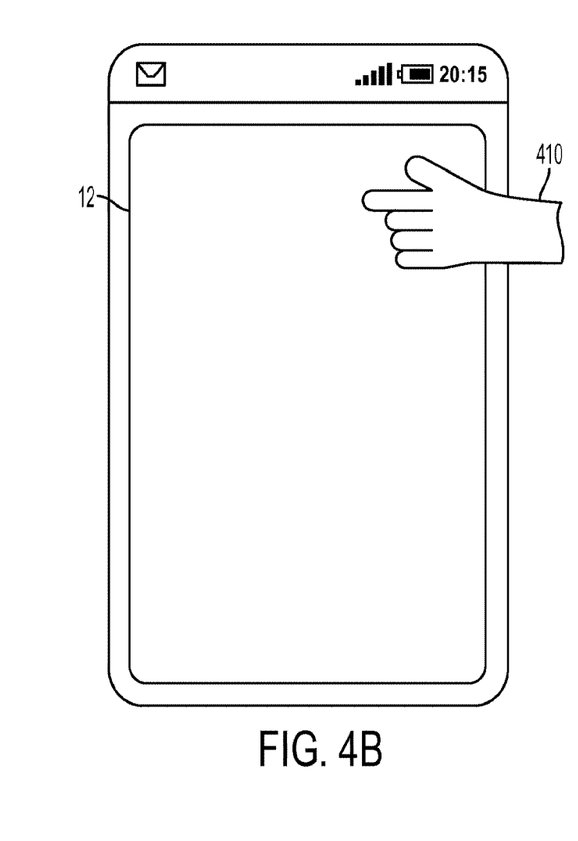

In some embodiments, the processor also may establish a third threshold location 215. The third threshold location will correspond to a coordinate on the touch-sensitive input component that is located a third threshold distance away from the starting location in either the first direction or the second direction. The third threshold distance may be greater than both the first threshold distance and the second threshold distance, and it may serve as a "rapid advance" threshold. If the processor determines (based on signals received from one or more sensors) that that the stroke applied to the touch-sensitive component has continuously moved to cross the third threshold without interruption 229, the system will dynamically display a series of content items 231 so long as the stroke remains across the threshold. For example, if the user slides his or her finger across the third threshold, the display may scroll through multiple photos so long as the user's finger remains above the threshold. An example is shown in Parts A and B of FIG. 4, where the third threshold location 407 has a y-coordinate that further away from the starting position 401 than that of the second threshold 405. When the user's finger 410 moves across the third threshold (as shown in Part B of FIG. 4), the display will continue to advance through content items so long as the user's finger does not move down and again cross the third threshold.

In some embodiments, when the processor detects that a stroke has moved across the first threshold, then in addition to displaying the next content item the system may provide the user with feedback 221 indicating that the user has crossed the threshold. The system may provide similar feedback 227 when the stroke crosses the second threshold. Either or both of the feedback items may include visual feedback (such as a visual indicator of the threshold location), audio feedback (such as a click, bell or other sound), or haptic feedback (such as a vibration or other tactile stimulus).

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A method, comprising:
    outputting, at a display of an electronic device, a first content item in a sequence of content items, wherein the sequence comprises the first content item and a second content item that sequentially follows the first content item in the sequence;
    detecting, by a processor of the electronic device, a touch input received at a touch-sensitive component of the electronic device;
    identifying, by the processor, a starting location on the touch-sensitive component, wherein the starting location includes a coordinate that corresponds to a location of the touch input; and
    enabling a minimized interaction with the touch-sensitive component by a user to move through the sequence of content items, wherein enabling the minimized interaction with the touch-sensitive component comprises:
        responsive to detecting that an input stroke continuously applied at the touch-sensitive component has continuously moved from the starting point to a first threshold location in a first direction, outputting, at the display, the second content item in the sequence, the first threshold location corresponding to a coordinate on the touch-sensitive component that is located a first threshold distance away, in a first direction, from the starting location; and
        responsive to detecting that the input stroke continuously applied at the touch sensitive component has moved across the first threshold location, reversing an order of display for the sequence of content items.

2. The method of claim 1, further comprising:
    determining whether the first content item is part of the sequence of content items; and
    identifying the starting location upon determining that the first content item is part of the sequence of content items.

3. The method of claim 1, further comprising:
    determining the first threshold distance based on one or more stored attributes of a user;
    determining the first threshold location based on the first threshold distance; and
    determining a second threshold location corresponding to a coordinate on the touch-sensitive component that is located a second threshold distance away from the starting location in a second direction opposite the first direction.

4. The method of claim 3, wherein the first threshold distance and the second threshold distance differ by less than a predetermined threshold.

5. The method of claim 3, further comprising:
    determining a third threshold location, wherein the third threshold location corresponds to a coordinate on the touch-sensitive component that is located a third threshold distance away from the starting location in either the first direction or the second direction, wherein the third threshold distance is greater than both the first threshold distance and the second threshold distance;
    detecting, by the processor, that the input stroke applied to the touch-sensitive component has continuously moved to cross the third threshold location without interruption; and
    outputting, at the display, a dynamic series of content items so long as the input stroke remains continuous and does not again cross the third threshold location.

6. The method of claim 3, further comprising:
    upon detecting that the touch input stroke continuously applied at the touch sensitive component has continuously moved from the starting location to the first threshold location in the first direction and then to the second threshold location in a reverse direction without interruption, outputting a third content item in the sequence of items at the display.

7. The method of claim 3 wherein reversing the order of display for the sequence of content items further comprises:
    detecting that the input stroke continuously applied at the touch sensitive component has moved across one of the first threshold location or the second threshold location the predefined number of times without crossing another one of the first threshold location or the second threshold location.

8. The method of claim 1, further comprising:
    detecting a speed of the input stroke; and
    in response to detecting the speed, adjusting a resolution of each content item before it is outputted at the display.

9. The method of claim 1, further comprising
    detecting, by the processor, that the input stroke has been interrupted, and increasing, in response to the detecting, a resolution of the content item that is outputted when the input stroke is interrupted.

10. The method of claim 1, wherein the touch-sensitive component comprises an element of the display.

11. The method of claim 1, further comprising:
    in response to detecting that the input stroke has continuously moved from the starting point to the first threshold without interruption, providing haptic feedback; and
    in response to detecting that the input stroke has continuously moved from the first threshold to the second threshold without interruption, providing haptic feedback.

12. An electronic device, comprising:
    a display;
    a processor;
    a touch-sensitive component; and a memory that stores program instructions that instruct the processor to:

output, at the display, a first content item in a sequence of content items, wherein the sequence comprises the first content item and a second content item that sequentially follows the first content item in the sequence;

detect a touch input received at the touch-sensitive component;

identify a starting location on the touch-sensitive component, wherein the starting location includes a coordinate that corresponds to a location of the touch input; and enable a minimized interaction with the touch-sensitive component by a user to move through the sequence of content items, wherein to enable the minimized interaction with the touch-sensitive component, the processor is further to:

responsive to detecting that an input stroke continuously applied at the touch-sensitive component has continuously moved from the starting point to a first threshold in a first direction, output, at the display, the second content item in the sequence, the first threshold location corresponding to a coordinate on the touch-sensitive component that is located a first threshold distance away, in a first direction, from the starting location; and responsive to detecting that the input stroke continuously applied at the touch sensitive component has moved across the first threshold location, reverse an order of display for the sequence of content items.

13. The device of claim 12, wherein the processor is further to:

determine the first threshold distance based on one or more stored attributes of a user;

determine the first threshold location based on the first threshold distance; and determine a second threshold location corresponding to a coordinate on the touch-sensitive component that is located a second threshold distance away from the starting location in a second direction opposite the first direction.

14. The device of claim 13, wherein the first threshold distance and the second threshold distance differ by less than a predetermined threshold.

15. The device of claim 13, wherein the processor is further to:

determine a third threshold location, wherein the third threshold location corresponds to a coordinate on the touch-sensitive component that is located a third threshold distance away from the starting location in either the first direction or the second direction, wherein the third threshold distance is greater than both the first threshold distance and the second threshold distance;

detect that the input stroke applied to the touch-sensitive component has continuously moved to cross the third threshold location without interruption; and output at the display, a dynamic series of content items so long as the input stroke remains continuous and does not again cross the third threshold location.

16. A non-transitory computer readable medium comprising instructions, which when executed by a processor, cause the processor to perform operations comprising:

outputting, at a display of an electronic device, a first content item in a sequence of content items, wherein the sequence comprises the first content item and a second content item that sequentially follows the first content item in the sequence;

detecting a touch input received at a touch-sensitive component of the electronic device;

identifying a starting location on the touch-sensitive component, wherein the starting location includes a coordinate that corresponds to a location of the touch input; and enabling a minimized interaction with the touch-sensitive component by a user to move through the sequence of content items, wherein enabling the minimized interaction with the touch-sensitive component comprises:

responsive to detecting that an input stroke continuously applied at the touch-sensitive component has continuously moved from the starting point to a first threshold in a first direction, outputting, at the display, the second content item in the sequence, the first threshold location corresponding to a coordinate on the touch-sensitive component that is located a first threshold distance away, in a first direction, from the starting location; and responsive to detecting that the input stroke continuously applied at the touch sensitive component has moved across the first threshold location, reversing an order of display for the sequence of content items.

17. The non-transitory computer readable medium of claim 16, wherein the operations further comprise:

detecting a speed of the input stroke; and in response to detecting the speed, adjusting a resolution of each content item before it is outputted at the display.

18. The non-transitory computer readable medium of claim 16, wherein the operations further comprise:

detecting that the input stroke has been interrupted, and increasing, in response to the detecting, a resolution of the content item that is outputted when the input stroke is interrupted.

19. The non-transitory computer readable medium of claim 16, wherein the touch-sensitive component comprises an element of the display.

20. The non-transitory computer readable medium of claim 16, wherein the operations further comprise:

in response to detecting that the input stroke has continuously moved from the starting point to the first threshold without interruption, providing haptic feedback; and in response to detecting that the input stroke has continuously moved from the first threshold to the second threshold without interruption, providing haptic feedback.

* * * * *